United States Patent
Wakitani et al.

(10) Patent No.: US 6,977,473 B2
(45) Date of Patent: Dec. 20, 2005

(54) TRAVEL CONTROL METHOD OF ELECTRIC VEHICLE

(75) Inventors: Tsutomu Wakitani, Wako (JP); Norikazu Shimizu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/949,911

(22) Filed: Sep. 24, 2004

(65) Prior Publication Data

US 2005/0088122 A1 Apr. 28, 2005

(30) Foreign Application Priority Data

Oct. 28, 2003 (JP) .............................. 2003-367775

(51) Int. Cl.[7] .............................................. H02P 7/08
(52) U.S. Cl. ........................... 318/64; 318/61; 318/66; 701/22; 37/246; 37/348
(58) Field of Search ......................... 318/66, 139, 567, 318/61, 64; 180/183, 907; 37/219, 234, 348, 37/246; 701/22, 70

(56) References Cited

U.S. PATENT DOCUMENTS

| | | | | |
|---|---|---|---|---|
| 4,572,311 | A * | 2/1986 | Oswald et al. ............. | 180/6.48 |
| 6,173,799 | B1 * | 1/2001 | Miyazaki et al. .......... | 180/19.3 |
| 6,267,190 | B1 * | 7/2001 | Micheletti .................. | 180/183 |
| 6,273,212 | B1 * | 8/2001 | Husted et al. .............. | 180/205 |
| 6,499,236 | B2 * | 12/2002 | Yoshida et al. ............. | 37/219 |
| 6,564,481 | B2 * | 5/2003 | Wakitani et al. ............. | 37/348 |
| 2002/0062583 | A1 * | 5/2002 | Wakitani et al. ............. | 37/246 |
| 2005/0090949 | A1 * | 4/2005 | Wakitani et al. ............. | 701/22 |

FOREIGN PATENT DOCUMENTS

JP          02142306          5/2002

* cited by examiner

Primary Examiner—Paul Ip
(74) Attorney, Agent, or Firm—Adams & Wilks (57) ABSTRACT

In a travel control method for an electric vehicle, an accelerator angle is obtained from a position of an accelerator lever. An accelerator percentage is determined in accordance with the accelerator angle. The ON times of first and second brake buttons are read. Brake percentages of first and second brakes are determined in accordance with the ON times of the respective first and second brake buttons. A control value for a first electric motor is determined by correcting the accelerator percentage with a corrected brake percentage of the first brake obtained by applying an influence of the brake percentage of the second brake to the brake percentage of the first brake. A speed of the first electric motor is controlled using the control value of the first electric motor. A control value for a second electric motor is determined by correcting the accelerator percentage with a corrected brake percentage of the second brake obtained by applying an influence of the brake percentage of the first brake to the brake percentage of the second brake. A speed of the second electric motor is controlled using the control value of the second electric motor.

6 Claims, 12 Drawing Sheets

LEFT BRAKE BUTTON ON TIME

FIG. 6B

RIGHT BRAKE BUTTON ON TIME

TRAVEL CONTROL METHOD OF ELECTRIC VEHICLE

FIELD OF THE INVENTION

The present invention relates to a travel control method of an electric vehicle having left and right electric motors for driving left and right drive wheels and left and right brakes for individually regulating the speeds of the left and right drive wheels.

BACKGROUND OF THE INVENTION

An electric vehicle having left and right electric motors for driving left and right drive wheels, left and right brakes for individually regulating the speeds of the left and right drive wheels, and a control part for controlling the speeds of the left and right electric motors is proposed for example in JP-A-2002-142306.

Generally, the speeds of the electric motors are directly controlled on the basis of an accelerator angle. However, in the case of the electric motors disclosed in JP-A-2002-142306, for example in controlling the left electric motor, control is carried out whereby when a left brake angle is large a left motor control value is lowered, and when a right brake angle is large the left motor control value is lowered further to take into account this right brake angle. And similar control is carried out for the right electric motor. Thus, the waste of rotating the electric motors at high speeds while braking is applied is avoided.

Also, normally, the vehicle sometimes sways due to the speeds of the left and right electric motors becoming unbalanced during operation. However, in the case of the electric motors in JP-A-2002-142306, because not only the left brake angle but also the right brake angle is taken into account with respect to the left electric motor, there ceases to be this concern, and irrespective of the state of the traveling surface speed regulation is easy and the vehicle has a smooth traveling characteristic.

Figure 10A:
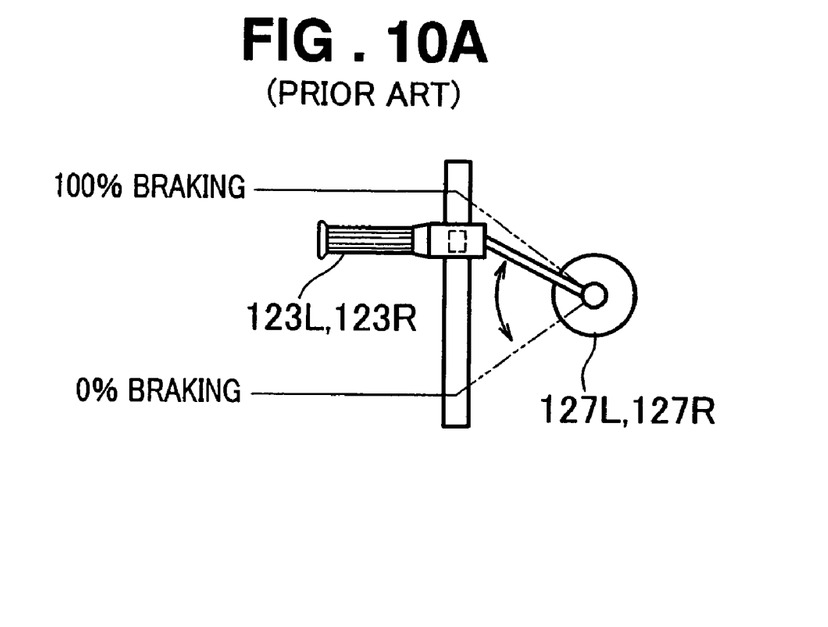
FIG. 10A shows a brake lever in related art.

Next, the action of a brake lever disclosed in JP-A-2002-142306 will be explained, on the basis of FIG. 10A and FIG. 10B.

Left and right brake levers 100L, 100R are control levers with which it is possible to switch continuously from brake percentage zero % (no braking) to brake percentage 100% (full braking). The position of the left brake lever 100L is monitored with a brake potentiometer 102L. The position of the right brake lever 100R is monitored with a brake potentiometer 102R.

Figure 10B:
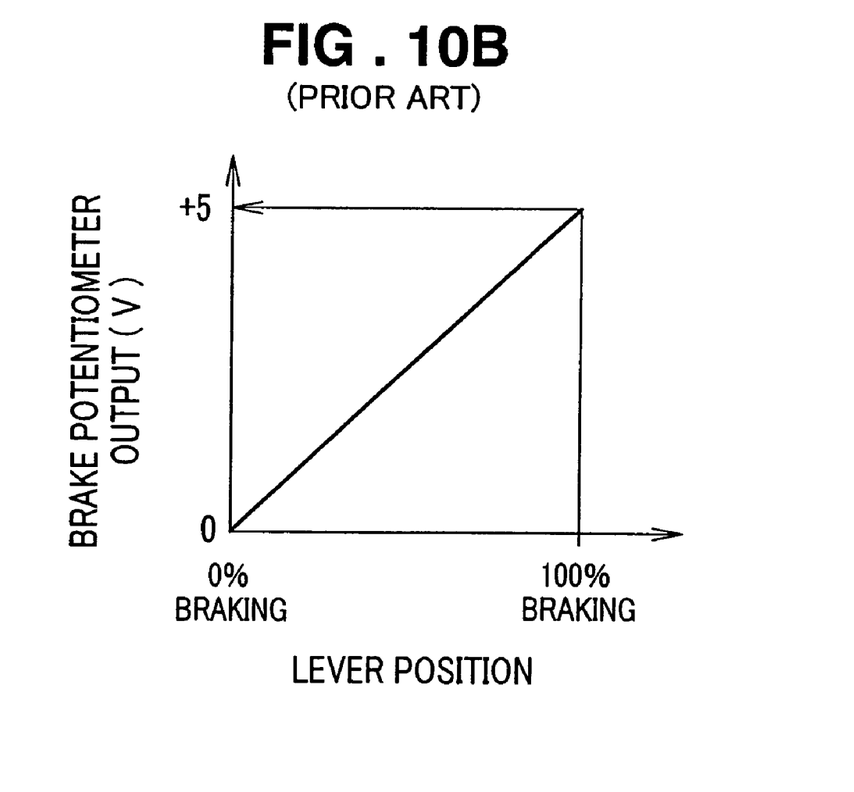
FIG. 10B is a graph showing a relationship between the position of a brake lever and an output voltage value from a potentiometer.

FIG. 10B is a graph showing the relationship between the positions of the left and right brake levers 100L, 100R and the output voltages of the left and right brake potentiometers 102L, 102R. When a brake percentage is zero %, the output voltage of the respective brake potentiometer 102L, 102R is zero V. When a brake percentage is 100%, the output voltage of the respective brake potentiometer 102L, 102R is 5V.

The brake potentiometers 102L, 102R are analog sensors, and have the merit that they can continuously obtain output voltages corresponding to the positions of the brake levers 100L, 100R easily.

However, because they are analog sensors, there is unavoidable dispersion among sensors, and zero point adjustment must be carried out for each individual sensor, and the time and cost entailed in this adjustment mount up. Also, analog sensors are generally somewhat expensive, and this has been a cause of increased cost of the electric vehicle, so that technology for making the detection of the brake angles cheaper has been awaited.

SUMMARY OF THE INVENTION

The present invention provides a travel control method of an electric vehicle for controlling the speeds of the left and right electric motors driving left and right drive wheels, the travel control method including: a step of reading in an accelerator angle from the position of an accelerator lever controlled by a driver; a step of determining an accelerator percentage on the basis of the accelerator angle; a step of reading in ON times of left and right brake buttons operated by the driver; a step of determining left and right brake percentages on the basis of the respective ON times of the left and right brake buttons; a step of determining a left motor control value by correcting the accelerator percentage with a corrected left brake percentage obtained by applying an influence of the right brake percentage to the left brake percentage; a step of controlling the speed of the left electric motor with the left motor control value; a step of determining a right motor control value by correcting the accelerator percentage with a corrected right brake percentage obtained by applying an influence of the left brake percentage to the right brake percentage; and a step of controlling the right electric motor with the right motor control value.

Thus in a method according to this invention brake percentages are determined on the basis of ON times of brake buttons. For example, if the left brake button is pressed for a long time, the left braking becomes stronger and the output of the left electric motor is reduced further, and a pivot turn to the left is thereby realized. Also, push-buttons are much cheaper than analog sensors such as potentiometers, and furthermore size and weight can be reduced. Therefore, it is easily possible to make the control part compact and to achieve reductions in sensor procurement costs and other device costs.

Preferably, when the accelerator percentage is represented by ACC %, the left brake percentage is represented by BKL %, the right brake percentage is represented by BKR %, a coefficient of the influence of the brake percentages with respect to the other electric motor is represented by p (where p<1), and a maximum value of the electric motor control values is represented by Vmax, then the left brake percentage is (BKL %+P×BKR %×ACC %), the left motor control value TG2L is Vmax×ACC % {1−(BKL %+p×BKR %×ACC %)}, the corrected right brake percentage is (BKR %+p×BKL %×ACC %), and the right motor control value TG2R is Vmax×ACC %×{1−(BKR %+p×BKL %×ACC %)}.

In this way, the accelerator percentage ACC % is taken into account in the corrected left brake percentage (BKL %+p×BKR %×ACC %). By the influence of the right brake percentage BKR % on the left motor control value being weakened when the accelerator percentage ACC %, which is linked to the vehicle speed, is small and being strengthened when the accelerator percentage ACC % is large, a left motor control value TG2L corresponding to the vehicle speed can be determined. The same is true for the right motor control value TG2R.

More preferably, when the accelerator percentage is represented by ACC %, the left brake percentage is represented by BKL %, the right brake percentage is represented by BKR %, a coefficient of the influence of either of the brake percentages with respect to the other electric motor is represented by p (where p<1), a correction coefficient for multiplying BKL %×ACC % and BKR %×ACC % by to approximate the left/right brake percentage to a second order curve is represented bvq, and the maximum value of the electric motor control values is represented by Vmax, then the left brake percentage is (BKL %+P×BKR %×ACC %−q×BKL %×ACC %), the left motor control value TG2L is Vmax×ACC %×{1−(BKL %+p×BKR %×ACC %−q×BKL %×ACC %)}, the corrected right brake percentage is (BKR %+p×BKL %×ACC %−q×BKR %×ACC %), and the right motor control value TG2R is Vmax×ACC %×{1−(BKR %+p×BKL %×ACC %−q×BKR %×ACC %)}.

That is, by correcting first order function brake percentages it is possible to weaken the braking more when the brake percentage is small and thereby moderate braking shocks.

BRIEF DESCRIPTION OF THE DRAWINGS

A number of preferred embodiments of the invention will be described below in detail on the basis of the accompanying drawings, in which.

DETAILED DESCRIPTION OF THE PREFERRED EMBODIMENTS

Preferred embodiments of a travel control method of an electric vehicle are described below, and as a suitable example of an electric vehicle the example of a snow-remover has been used.

Figure 1:
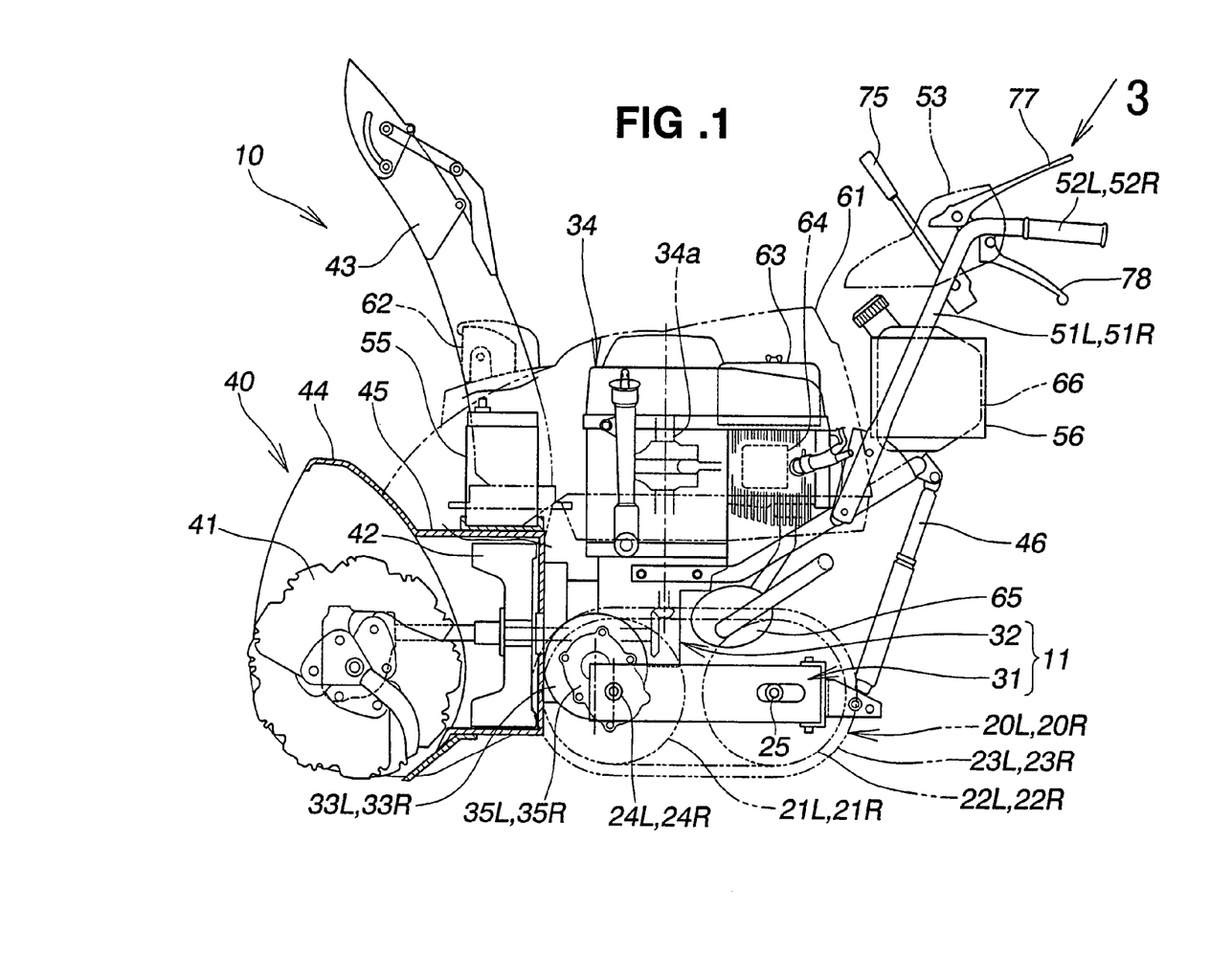
FIG. 1 is a left side view of a snow-remover according to the invention.
Figure 2:
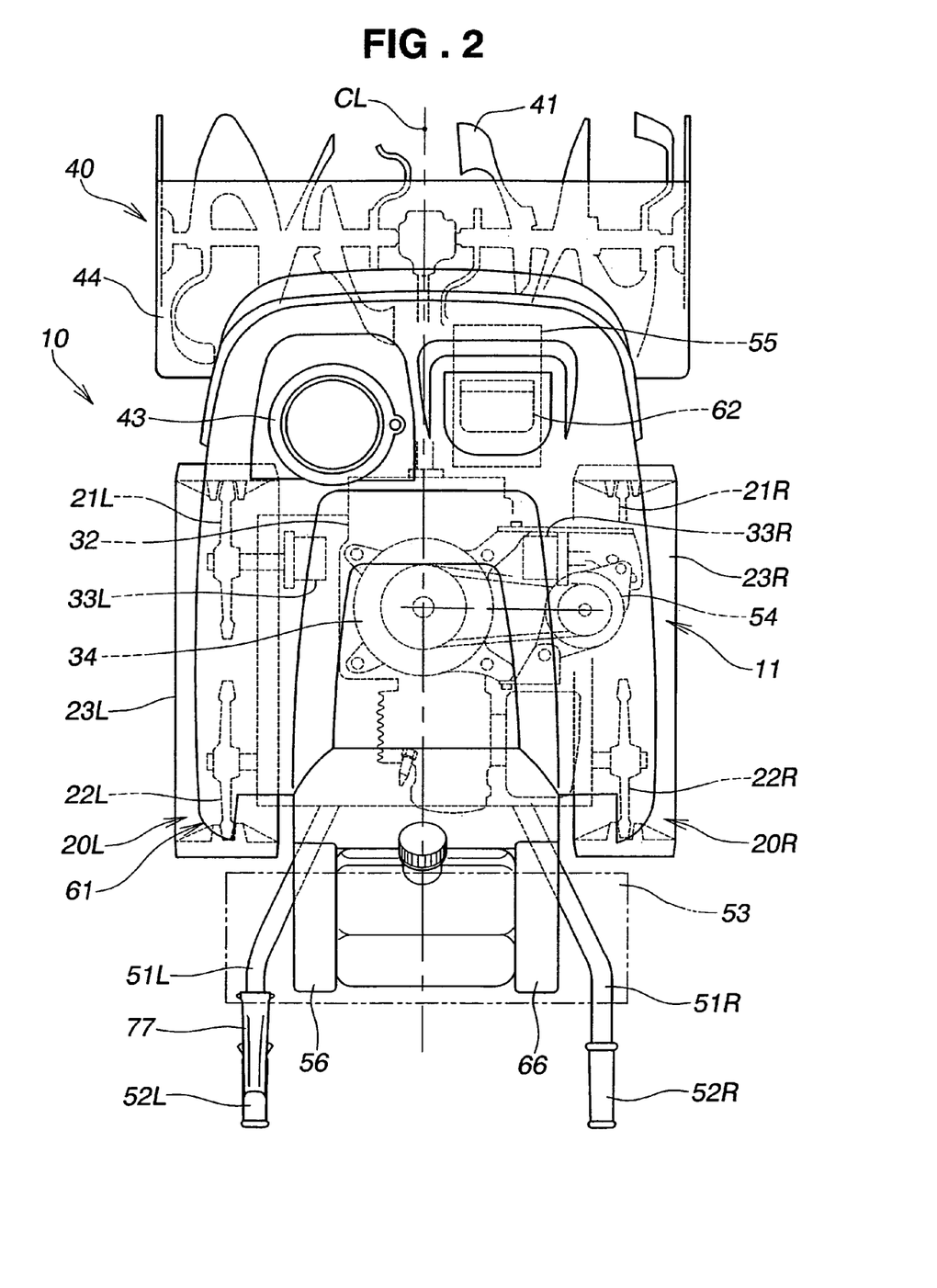
FIG. 2 is a plan view of the snow-remover shown in FIG. 1.

As shown in FIG. 1 and FIG. 2, a snow-remover 10, which is an electric vehicle, includes a machine body 11 made up of a transport frame 31 and a transmission case 32.

The transport frame 31 has left and right transporting parts 20L, 20R. The transmission case 32 is attached to the transport frame 31 in such a way that it can swing up and down. Left and right electric motors 33L, 33R are mounted on left and right side parts of the transmission case 32. An engine 34 is mounted on an upper part of the transmission case 32. A snow-removal working part 40 is mounted on the front of the transmission case 32. Left and right operating handles 51L, 51R extend upward and rearward from the top of the transmission case 32. A control panel 53 is provided between the left and right operating handles 51L, 51R.

The snow-remover 10 is a self-propelled, walking-type working machine whose operator walks behind the control panel 53.

The left and right operating handles 51L, 51R have grips 52L, 52R at their ends to be gripped by hands.

It is a characteristic feature of the snow-remover 10 of this invention that the snow-removal working part 40 is driven by the engine 34 and the transporting parts 20L, 20R are driven by the electric motors 33L, 33R. This approach is adopted on the basis of the idea that for control of travel speed, turning control and forward-reverse switching control electric motors are preferable, whereas for the working parts, which are subject to sharp load fluctuations, a more powerful internal combustion engine is appropriate.

The left and right electric motors 33L, 33R are drive sources for propulsion, for driving the left and right transporting parts 20L, 20R via left and right transport transmission mechanisms 35L, 35R.

The left transporting part 20L is a crawler having a crawler belt 23L passing around a front drive wheel 21L and a rear driven wheel 22L, and rotates the drive wheel 21L forward and in reverse with the left drive motor 33L.

The right transporting part 20R is a crawler having a crawler belt 23R passing around a front drive wheel 21R and a rear driven wheel 22R, and rotates the drive wheel 21R forward and in reverse with the right electric motor 33R.

The transport frame 31 rotatably supports left and right drive wheel axles 24L, 24R and at its rear end supports a driven wheel axle 25. The left and right drive wheel axles 24L, 24R are rotating shafts to which the left and right drive wheels 21L, 21R are fixed. The driven wheel axle 25 has the left and right driven wheels 22L, 22R rotatably attached to it.

The engine 34 is a vertical engine having a crankshaft 34a extending downward, and is a for-working drive source for driving the snow-removal working part 40 by transmitting a driving force thereto via a for-working transmission mechanism housed in the transmission case 32.

The snow-removal working part 40 is made up of an auger 41 at the front, a blower 42 at the rear, a shooter 43 at the top, an auger housing 44 covering the auger 41, and a blower housing 45 covering the blower 42. The auger 41 has an action of collecting snow piled on the ground to the center. The blower 42 receives this snow and blows the snow through the shooter 43 to a desired position beside the snow-remover 10.

A swing drive mechanism 46 adjusts the attitude of the auger housing 44 by swinging the transmission case 32 and the snow-removal working part 40 up and down.

As shown in FIG. 2, the machine body 11 has generator 54 and a battery 55 mounted at its front.

In this way, the snow-remover 10 has a working part 40, such as a snow-removing part, on a machine body 11; an engine 34 for driving this working part 40; transporting parts 20L, 20R made up of crawlers and wheels; electric motors 33L, 33R for driving these transporting parts 20L, 20R; a generator 54, driven by the engine 34, for supplying electrical power to a battery 55 and the electric motors 33L, 33R; and a control part 56 for controlling the rotation of the electric motors 33L, 33R. The control part 56 is for example disposed below the control panel 53 or built into the control panel 53.

In the drawings, the reference number 61 denotes a cover covering the engine 34; 62 a lamp; 63 an air cleaner; 64 a carburetor; 65 an engine exhaust muffler; and 66 a fuel tank.

Figure 3:
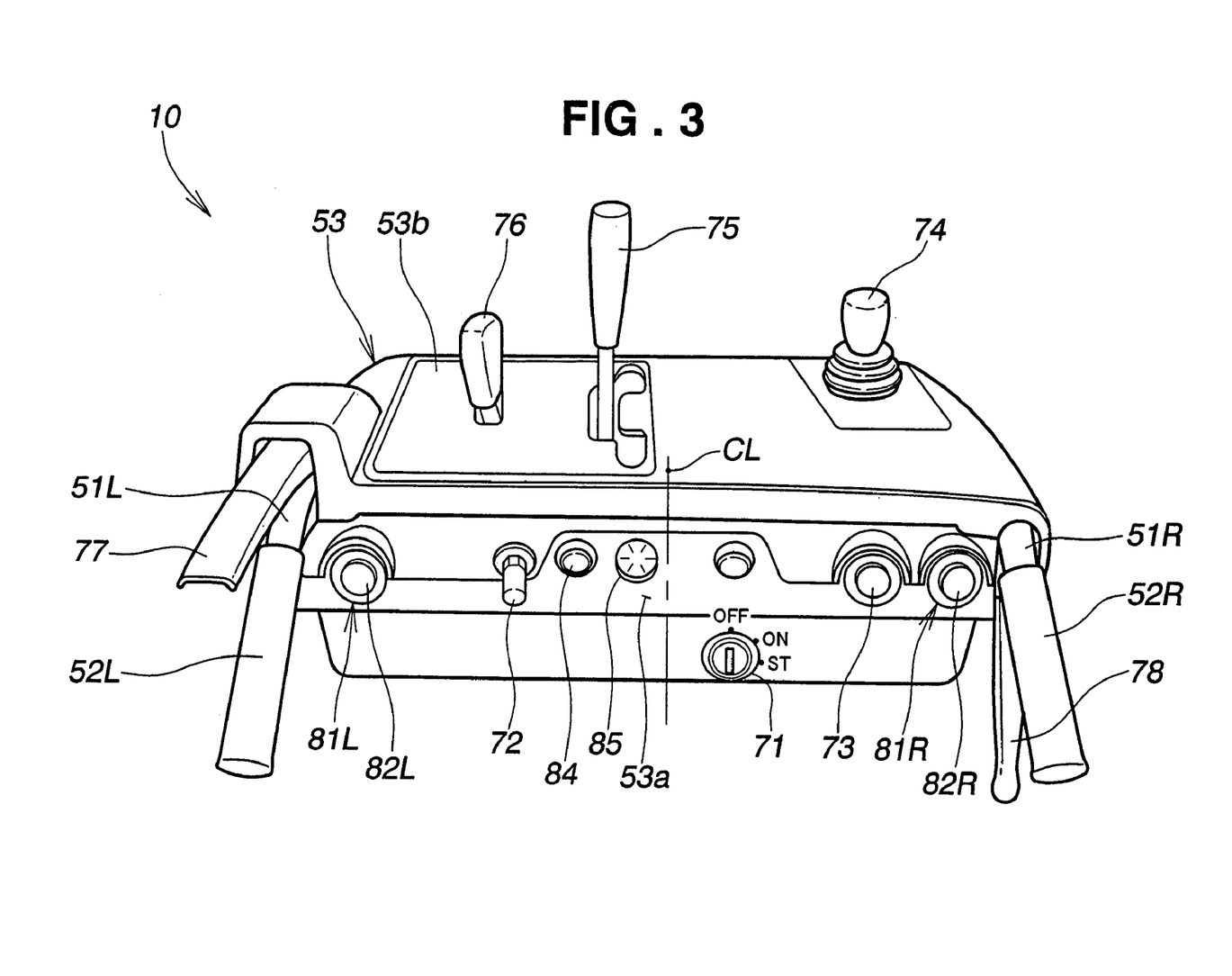
FIG. 3 is a view in the direction of the arrow 3 in FIG. 1.

As shown in FIG. 3, the control panel 53 has on a rear face 53a thereof (the face on the operator side) a main switch 71, an engine choke 72 and a clutch operating switch 73. On the top face 53b of the control panel 53 are provided, in order from the right side to the left side, a snow-throwing direction adjusting lever 74, a direction/speed lever 75 serving as a direction/speed control member pertaining to the transporting part, and an engine throttle lever 76. Also, the grip 52L is disposed to the left of the control panel 53 and the grip 52R is disposed to the right of the control panel 53.

The left operating handle 51L has a travel preparation lever 77 near to the grip 52L. The right operating handle 51R has an auger housing attitude adjusting lever 78 near to the grip 52R.

Referring to FIG. 1 and FIG. 3, the main switch 71 is an ordinary ignition switch with which it is possible to start the engine 34 by inserting a main key (not shown) into a key insertion hole and turning it, and for example an 'off position OFF', an 'on position ON' and a 'start position ST' are arranged in order clockwise around the key insertion hole.

When the main key is turned to the off position OFF, the engine 34 is stopped and the entire electrical system is shut down. When the main key is turned from the off position OFF to the on position ON, the engine 34 is kept in a stopped state. When the main key is turned to the start position ST, the engine 34 is started. When the main key is turned from the start position ST to the on position ON, the started engine 34 shifts to normal running.

An engine choke 72 is a control member that raises the concentration of the fuel-air mixture when pulled. The clutch operating switch 73 is a push-button switch for turning on and off the auger 41 and the blower 42, that is, a switch for on/off-controlling the snow-removal working part 40. Hereinafter, the clutch operating switch 73 will for convenience be referred to as 'the auger switch 73'.

The snow-throwing direction adjusting lever 74 is a lever operated to change the direction of the shooter 43.

The direction/speed lever 75 is a forward/reverse speed adjusting lever for controlling the travel speed of the electric motors 33L, 33R and switching between forward and reverse by controlling the direction of rotation of the electric motors 33L, 33R.

Figure 4:
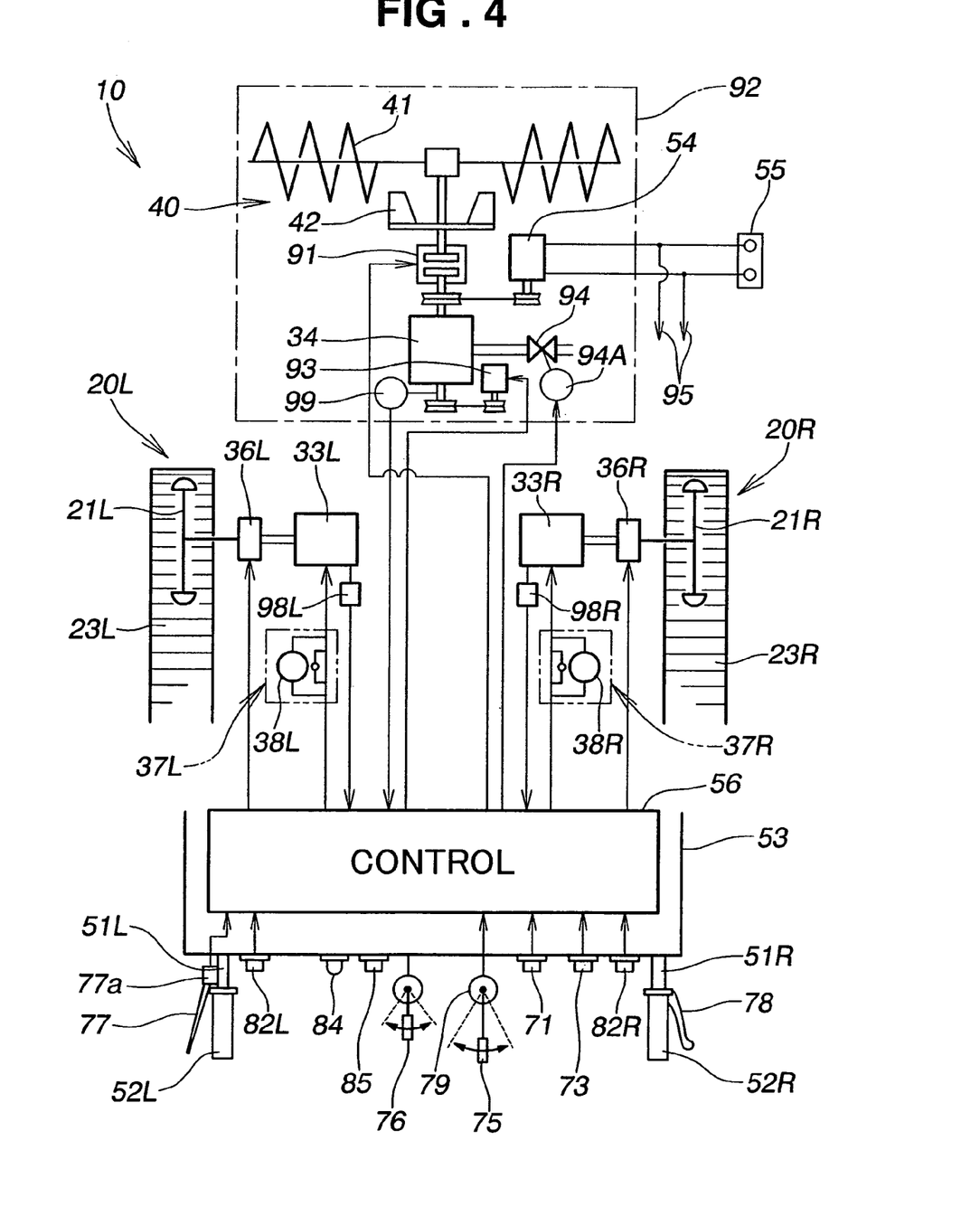
FIG. 4 is an electrical system diagram of the snow-remover shown in FIG. 1.

The engine throttle lever 76 controls the speed of the engine 34 by adjusting the aperture of a throttle valve (see reference number 94 in FIG. 4).

The travel preparation lever 77 is a travel preparation member that acts on switching means (see reference numeral 77a in FIG. 4) and turns the switching means off under a pulling action of a return spring when in the free state shown in the figure. When the left hand of the operator grips the travel preparation lever 77 and moves it toward the grip 52L, the switching means turns on. In this way, the switching means detects whether or not the travel preparation lever 77 is being gripped.

The auger housing attitude adjusting lever 78 is a lever operated to control the swing drive mechanism 46 to change the attitude of the auger housing 44.

Also on the control panel 53, between the left and right operating handles 51L, 51R and located so that they can be operated by hands gripping these left and right operating handles 51L, 51R, left and right turn control switches 81L, 81R are provided.

The left turn control switch 81L consists of a push-button switch and has a left brake button 82L facing rearward (toward the operator) from the snow-remover 10. This left turn control switch 81L is an automatically returning contact switch that switches on and produces a switch signal only as long as the left brake button 82L is being pressed.

The right turn control switch 81R consists of a push-button switch and has a right brake button 82R facing rearward (toward the operator) from the snow-remover 10. This right turn control switch 81R is an automatically returning contact switch that switches on and produces a switch signal only as long as the right brake button 82R is being pressed.

Specifically, of the rear face 53a of the control panel 53, the left turn control switch 81L and its left brake button 82L are disposed near the left grip 52L in a position on the machine width center CL side thereof And of the rear face 53a of the control panel 53, the right turn control switch 81R and its right brake button 82R are disposed near the right grip 52R and in a position on the machine width center CL side thereof.

When the operator grips the left and right operating handles 51L, 51R with both hands, the thumbs of both hands are on the inner sides (the machine width center CL sides) of the operating handles 51L, 51R.

When while gripping the left and right operating handles 51L, 51R with both hands and steering the snow-remover 10 the operator extends the thumb of the left hand forward and pushes the left brake button 82L of the left turn control switch 81L while still gripping the operating handles 51L, 51R, for as long as the left brake button 82L is pressed the snow-remover 10 turns to the left. And for as long as the operator extends the thumb of the right hand forward and presses the right brake button 82R of the right turn control switch 8 1R, the snow-remover 10 turns to the right.

In this way, without removing the hands from the left and right operating handles 51L, 51R, it is possible to perform a turning maneuver extremely easily with a small operating force.

Because the left and right turn control switches 81L, 81R, which operate regenerative braking circuits (see reference numerals 38L, 38R of FIG. 4) serving as turning mechanisms, are provided between the left and right operating handles 51L, 51R on the control panel 53 and located so that they can be operated by hands gripping these left and right operating handles 51L, 51R, while gripping the left and right operating handles 51L, 51R with both hands and steering the snow-remover 10 (see FIG. 1) the operator can also operate the left and right turn control switches 81L, 81R with thumbs still gripping the operating handles 51L, 51R. Accordingly, it is not necessary to swap grips of the operating handles 51L, 51R or to remove the hands from the operating handles 51L, 51R each time the snow-remover 10 is left-turned or right-turned. Consequently, the steerability of the snow-remover 10 increases.

Also, an information display 84 and a sounder 85 serving as annunciators are further provided on the rear face 53a of the control panel 53.

The information display 84 is a part for displaying information on the basis of a command signal from the control part 56, and for example consists of a liquid crystal display panel or display lights. The sounder 85 is a part for producing a sound on the basis of a command signal from the control part 56, and for example consists of a buzzer for producing a report sound or a speech generator for producing speech.

FIG. 4 is a control diagram of a snow-remover according to the invention. The engine 34, an electromagnetic clutch 91, the auger 41 and the blower 42 constitute a working part system 92, and the rest constitutes a transporting part system.

First, the operation of the snow-removal working part 40 will be described.

When the key is inserted into the main switch 71 and turned to the start position ST shown in FIG. 3, a cell motor (starter) 93 turns and the engine 34 starts.

The engine throttle lever 76 adjusts the aperture of a throttle valve 94 by way of a throttle wire (not shown), and thereby controls the speed of the engine 34.

Also, the throttle aperture of the throttle valve 94 is automatically controlled by way of a valve driving part 94A in accordance with a control signal from the control part 56. In the throttle valve 94, the aperture control of the valve driving part 94A takes priority over aperture control with the engine throttle lever 76.

Some of the output of the engine 34 rotates the generator 54, and the electrical power obtained is supplied to the battery 55 and the left and right electric motors 33L, 33R. The remainder of the output of the engine 34 drives the auger 41 and the blower 42 via the electromagnetic clutch 91. Electrical power is supplied to the left and right electric motors 33L, 33R and other electrical components from the generator 54 and the battery 55 via a harness 95.

The reference numerals 98L, 98R denote sensors for detecting the speeds (motor speeds; rotational speeds) of the left and right electric motors 33L, 33R. The reference number 99 denotes a sensor for detecting the speed (rotational speed) of the engine 34.

When the travel preparation lever 77 is gripped and the clutch operating switch 73 is operated, the electromagnetic clutch 91 is engaged and the auger 41 and the blower 42 are rotated by motive power from the engine 34. When the travel preparation lever 77 is released, or when the clutch operating switch 73 is pressed again, the electromagnetic clutch 91 disengages.

Next, the operation of the transporting parts 20L, 20R will be explained.

The snow-remover 10 of this invention has left and right electro-magnetic brakes 36L, 36R which are equivalent to a vehicle parking brake. Specifically, the motor shafts of the left and right electric motors 33L, 33R are braked by the left and right electromagnetic brakes 36L, 36R. While the snow-remover 10 is parked, these electromagnetic brakes 36L, 36R are in a braking state under the control of the control part 56. The electromagnetic brakes 36L, 36R are released by the procedure explained below.

When the two conditions of the main switch 71 being in its ON position and the travel preparation lever 77 being gripped are satisfied, if the direction/speed lever 75 is switched to forward or reverse, the electromagnetic brakes 36L, 36R assume a released (non-braking; OFF) state.

Figure 5A:
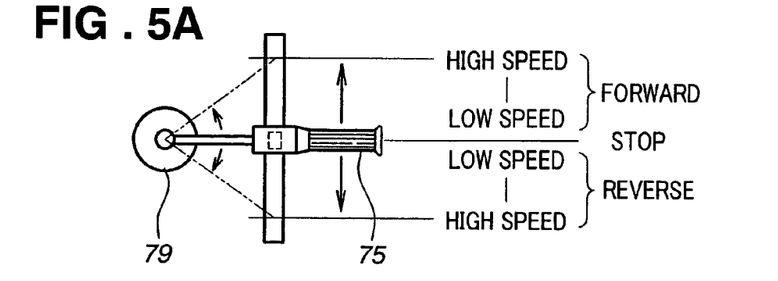
FIG. 5A is a view showing operating positions of a direction/speed lever shown in FIG. 3, and FIGS. 5B and 5C are graphs of the output voltage value of an accelerator potentiometer vs. the position of the direction/speed lever.

As shown in FIG. 5A, the direction/speed lever 75 can move back and forth as shown with arrows and is controllable to a forward range, a stop position, and a reverse range. In the forward range and in the reverse range, it can be switched continuously from a low speed to a high speed. The position of this direction/speed lever 75 is monitored with an accelerator potentiometer 79.

The reference numerals 37L, 37R denote motor drivers, and these include the regenerative braking circuits 38L, 38R (FIG. 4).

Figure 5B:
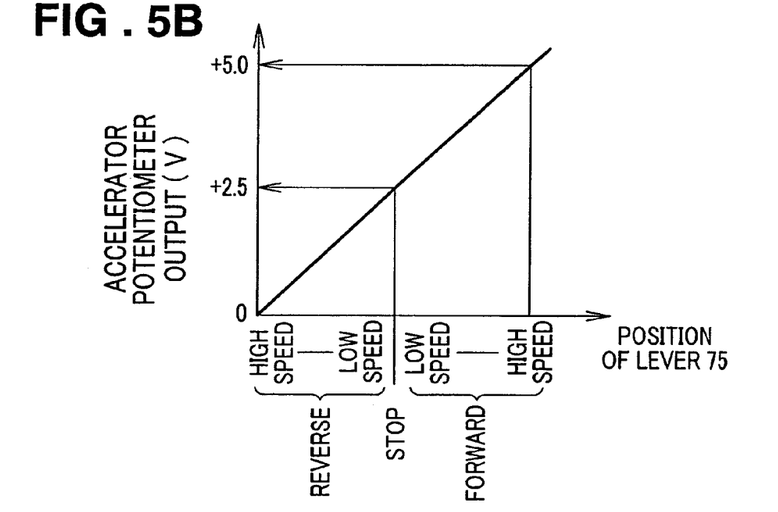

FIG. 5B is a graph showing the relationship between the position of the direction/speed lever 75 and the output voltage of the accelerator potentiometer 79. When the output range of the accelerator potentiometer 79 is made 0 to +5V (Volts), a reverse high speed is allocated to 0V, neutral (stop) to +2.5V and a forward high speed to +5V.

Figure 5C:
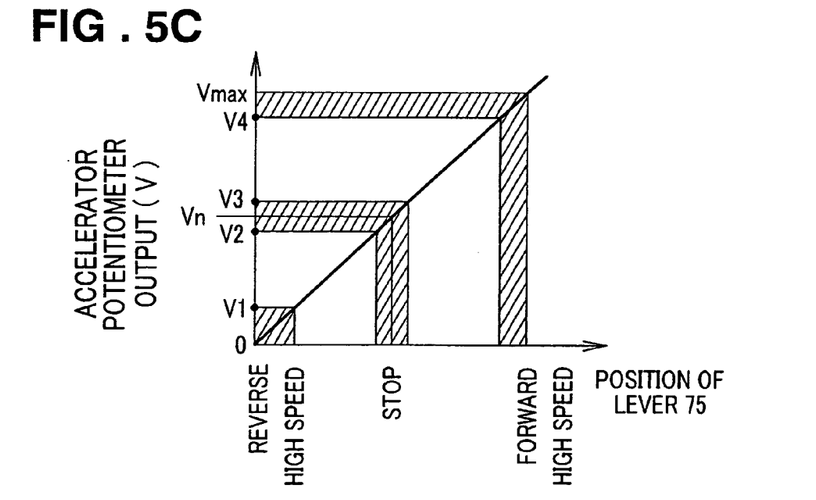

FIG. 5C is a graph obtained by adapting the graph shown in FIG. 5B for the control of the present preferred embodiment. Reverse High Speed (horizontal axis) has been made 0V (vertical axis); Stop (horizontal axis) has been made Vn (vertical axis), which is a neutral voltage; and Forward High Speed (horizontal axis) has been made Vmax (vertical axis), which is a maximum voltage.

Now, when the driver has set the direction/speed lever 75 in the vicinity of Forward High Speed, because it is the wish of the driver to invoke a forward high speed, the control carried out in this preferred embodiment is not applied. That is, the range V4 to Vmax (shown with hatching) in FIG. 5C is a non-control range.

Similarly also when the driver has set the direction/speed lever 75 in the vicinity of Reverse High Speed, because it is the wish of the driver to invoke a reverse high speed, the control carried out in this preferred embodiment is not applied. That is, the range 0 to V1 (shown with hatching) in FIG. 5C is a non-control range.

Also, when the driver has set the direction/speed lever 75 to Stop or to a very low speed, because it is the wish of the driver to invoke Stop or a very low speed, the control carried out in this preferred embodiment is not applied. That is, the range V2 to V3 (shown with hatching) in FIG. 5C is a non-control range.

That is, in FIG. 5C the control of this preferred embodiment is carried out in the ranges V1 to V2 and V3 to V4.

Figure 6A:
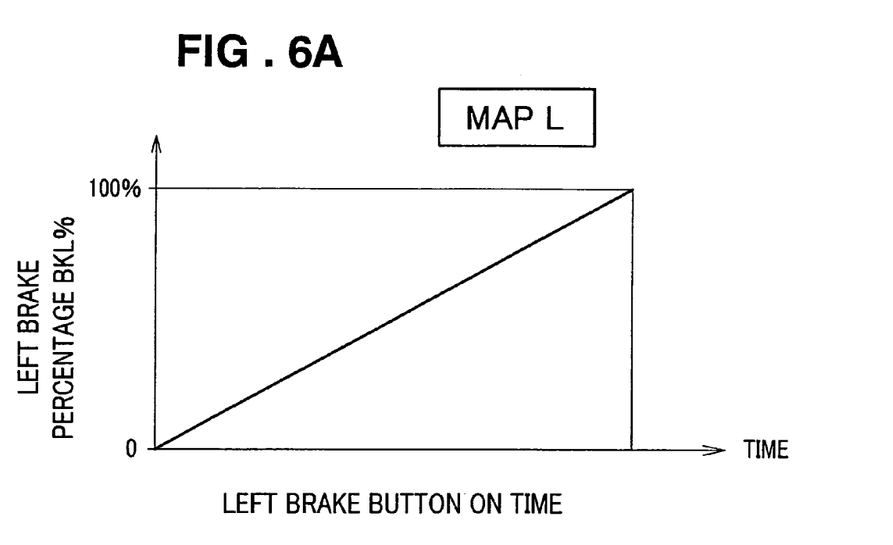
FIG. 6A and FIG. 6B are maps showing brake percentages vs. ON times of brake buttons used in the invention.

FIG. 6A is a 'map L' showing the relationship between the ON time of the left brake button 82L and a left brake percentage BKL %.

Immediately after the operator presses the left brake button 82L, because the ON time is near the origin, the BKL % is approximately zero. When the left brake button 82L continues to be pressed, the BKL % increases to a maximum of 100% in proportion (first order function) with the ON time. This map L is stored in a memory part of the control part 56. The control part 56 determines a left brake percentage BKL % by reading out the BKL % corresponding to the ON time of the left brake button 82L.

Figure 6B:
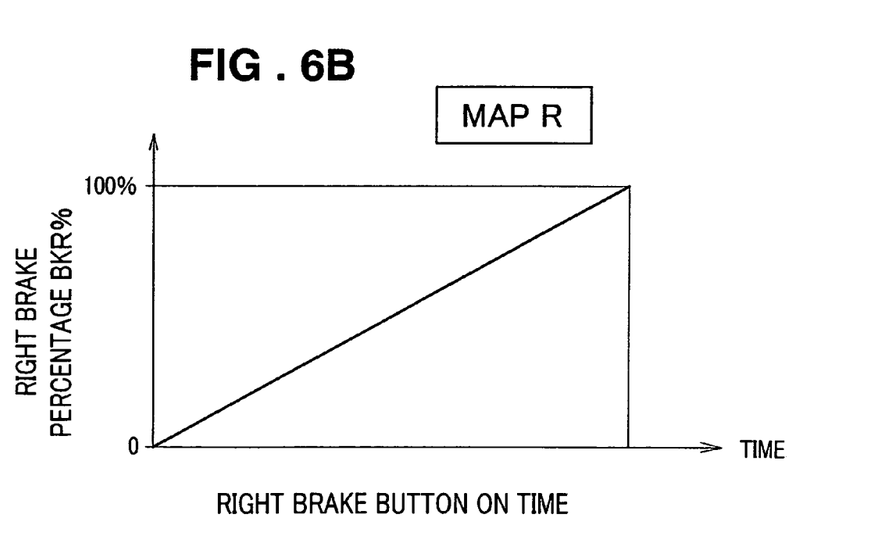

FIG. 6B is a 'map R' for the right brake button 82R, and since the content and usage of the map are the same as those of FIG. 6A they will not be explained again.

Although in this preferred embodiment an example wherein the map L and the map R are in graph form has been shown to facilitate understanding, alternatively they may be stored in the control part in the form of first order functions.

Although in this preferred embodiment a map L and a map R have been shown for convenience, alternatively a single map or functional expression may be used for both the left and right brakes.

In this preferred embodiment a first order function is employed. The reason for this is that when a second order function or a higher order function is used, the storage area and the load on the computing part in the control part 56 increase, and it becomes necessary to equip the control part 56 with a high-bit, high-byte computing part. If a first order function is used, on the other hand, a cheap computing part will suffice, and the control part 56 can be made more compact and lower-in cost.

Next, speed-reduction control of the left and right electric motors according to the invention will be explained, on the basis of the flow chart shown in FIG. 7A to FIG. 7D.

First, in FIG. 7A, step (hereinafter abbreviated to ST) 01: An accelerator angle ACCV corresponding to the output voltage of the accelerator potentio-meter 79 shown in FIG. 5A is read in.

ST02: It is determined whether or not the accelerator angle ACCV read in is above the neutral voltage Vn shown in FIG. 5C. If it is above the neutral voltage Vn, it is inferred that the vehicle is in 'Forward', and processing proceeds to ST03f. When the accelerator angle ACCV is below the neutral voltage, it is inferred that the vehicle is in 'Reverse' and processing proceeds to ST03r.

ST03f: It is determined whether or not the accelerator angle ACCV is in the voltage range V3 to V4 shown in FIG. 5C. When the accelerator angle ACCV is in the voltage range V3 to V4, it is inferred that the vehicle is in a controllable range, and processing proceeds to ST04f. Otherwise, the vehicle is in a non-controllable range, and processing ends.

ST04f: If the accelerator angle ACCV is in the voltage range V3 to V4, the proportion of ACCV in this range (an accelerator percentage ACC %) is calculated. The formula for the calculation is accelerator percentage ACC %= (ACCV−V3)/(V4−V3).

ST03r: If the determination in ST02 is NO, it is determined whether or not the accelerator angle ACCV is in the voltage range V1 to V2 shown in FIG. 5C. If it is in the voltage range V1 to V2 then it is inferred that the vehicle is in a controllable range and processing proceeds to ST104r. Otherwise the vehicle is in a non-controllable range and processing ends.

ST04r: If the accelerator angle ACCV is in the voltage range V1 to V2, the proportion of ACCV in this range (an accelerator percentage ACC %) is calculated. The formula for the calculation is accelerator percentage ACC %= (ACCV−V1)/(V2−V1).

ST05: From ST04f or ST04r, an accelerator percentage ACC % is determined.

ST06L: The ON time of the left brake button 82L is read in.

ST07L: Reference is made to the map L shown in FIG. 6A.

ST08L: From the ON time of the left brake button 82L and the map L, a left brake percentage BKL % is determined.

Similarly for the right brake, the following steps are executed.

ST06R: The ON time of the right brake button 82R is read in.

ST07R: Reference is made to map R of FIG. 6B.

ST08R: From the ON time of the right brake button 82R and the map R, a right brake percentage BKR % is determined.

The flow chart shown in FIG. 7B will now be explained.

ST09L: On the basis of the Vmax shown in FIG. 5C, the ACC % determined in ST05 of FIG. 7A and the BKL % calculated in ST08L, the following calculation is carried out. TG1L=Vmax×ACC %×(1−BKL %).

When the left brake percentage BKL % is large, it is wasteful to feed a large voltage to the left electric motor 33L, and it is desirable to cut down the power supplied to the left electric motor 33L.

When the left brake percentage BKL % is large, BKL % takes a large value near to 1.0, and (1−BKL %) takes a small value near to 0. By multiplying this (1−BKL %) by (Vmax×ACC %) it is possible to set an amended accelerator angle that takes into account the left brake percentage.

It is advantageous to take into account the left brake percentage like this when determining the voltage at which the left electric motor 33L is controlled. However, if the right brake percentage is large, it is desirable for the control voltage of the left electric motor 33L to be lowered still further. If the right brake percentage is small, its influence on the left electric motor 33L can be ignored.

It is more desirable to take into account both the left brake percentage and the right brake percentage like this when determining the voltage at which the left electric motor 33L is controlled.

So, the idea of replacing the BKL % in the last term of ST09L with (BKL %+p×BKR %×ACC %) will be considered. BKR % is the right brake percentage.

When considering the left electric motor 33L, it seems likely that the influence of the right brake percentage will be more significant the larger is the accelerator percentage ACC %. So, the right brake percentage BKR % is multiplied by ACC %. And because when BKR % is directly added to BKL % the influence of the right brake percentage BKR % is too strong, it is multiplied by a coefficient p of about 0.3 to 0.5.

It can be seen that it is then appropriate to replace the BKL % in the last term of ST09L with (BKL %+p×BKR %×ACC %). This (BKL %+p×BKR %×ACC %) will be called the first left corrected brake percentage.

ST10L: An amended value TG2L (left motor control value) of TG1L is calculated using the following formula. TG2L=Vmax×ACC %×{1−(BKL %+p×BKR %×ACC %)}.

ST11L: Because a left motor control value TG2L has been determined, the left electric motor 33L is driven in accordance with this TG2L.

Because ST09R and ST10R are the same as ST09L and ST10L with L replaced with R and with R replaced with L, their description will be omitted.

ST11R: Because a right motor control value TG2R has been determined, the right electric motor 33R is driven in accordance with this TG2R.

If the left and right electric motors 33L, 33R are controlled on the basis of the flow described above, it becomes unnecessary to supply the left and right electric motors with unnecessary electric power, and electrical energy can be saved in the electric vehicle.

Figure 8A:
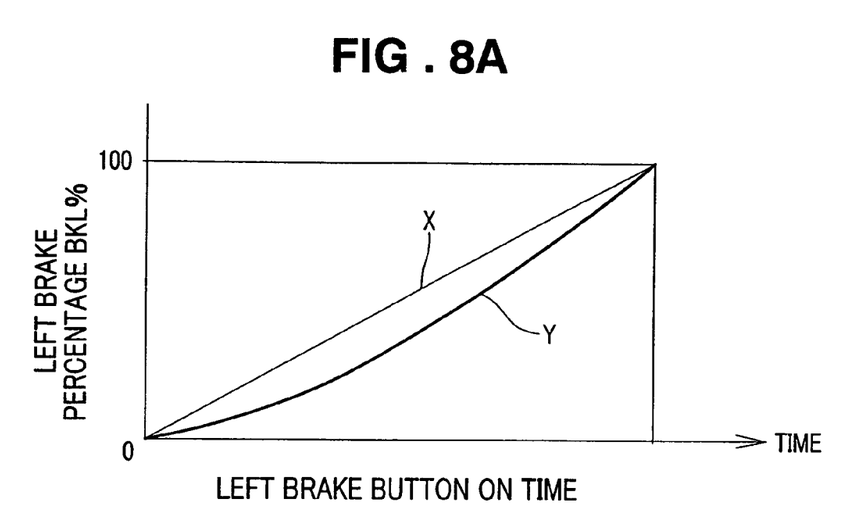
FIG. 8A and FIG. 8B are graphs showing another preferred embodiment of obtaining brake percentages.
Figure 8B:
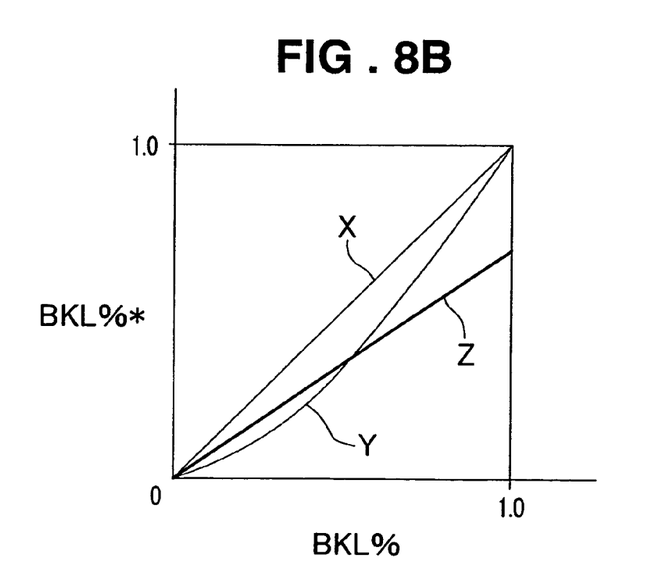

FIG. 8A and FIG. 8B show other preferred embodiments of the graphs for obtaining brake percentages shown in FIGS. 6A and 6B.

FIG. 6A, a straight line X passing through the origin is used for the calculation.

On the other hand, as shown in FIG. 8A, when deceleration phenomena that accompany braking are considered, it is desirable that braking be carried out gently at first and then the deceleration be increased, and a second order curve Y is preferable. However, the use of a second order curve Y is problematic from the point of view of cost.

FIG. 8B is a graph for correcting the left brake percentage BKL %, in which the vertical axis shows a second left corrected brake percentage BKL %* (different from first and third left corrected brake percentages mentioned above and below). The straight line X before correction is expressed as BKL %*= BKL %, of which the gradient is +1. On the other hand, the curve Y is a curve that is convex downwardly from the straight line X. Therefore, if a straight line Z with a positive gradient smaller than +1 is drawn, where BKL % is small this straight line Z approximates to the curve Y. That is, by using the straight line Z it is possible to make the initial braking gentle.

The gradient of the straight line Z will now be considered. If the accelerator percentage ACC % is large, because the vehicle speed becomes high, braking shock becomes marked. To moderate this braking shock it is necessary to make the curve Y more downwardly convex. Conversely, when the accelerator percentage ACC % is small and the vehicle speed is low, the braking shock is small and there is less need to moderate this braking shock, so the curve Y can be brought closer to the straight line X.

From the above, it is optimal for the straight line Z to be expressed as BKL %*=(1−q×ACC %)BKL %, where q is a coefficient. If ACC % is large, the gradient of the straight line Z is much smaller than 1. If ACC % is small, the gradient of the straight line Z approaches 1.

Control employing this BKL %*=(1−q×ACC %)BKL % will now be described on the basis of the flow chart shown in FIG. 9A and FIG. 9B.

Figure 7A:
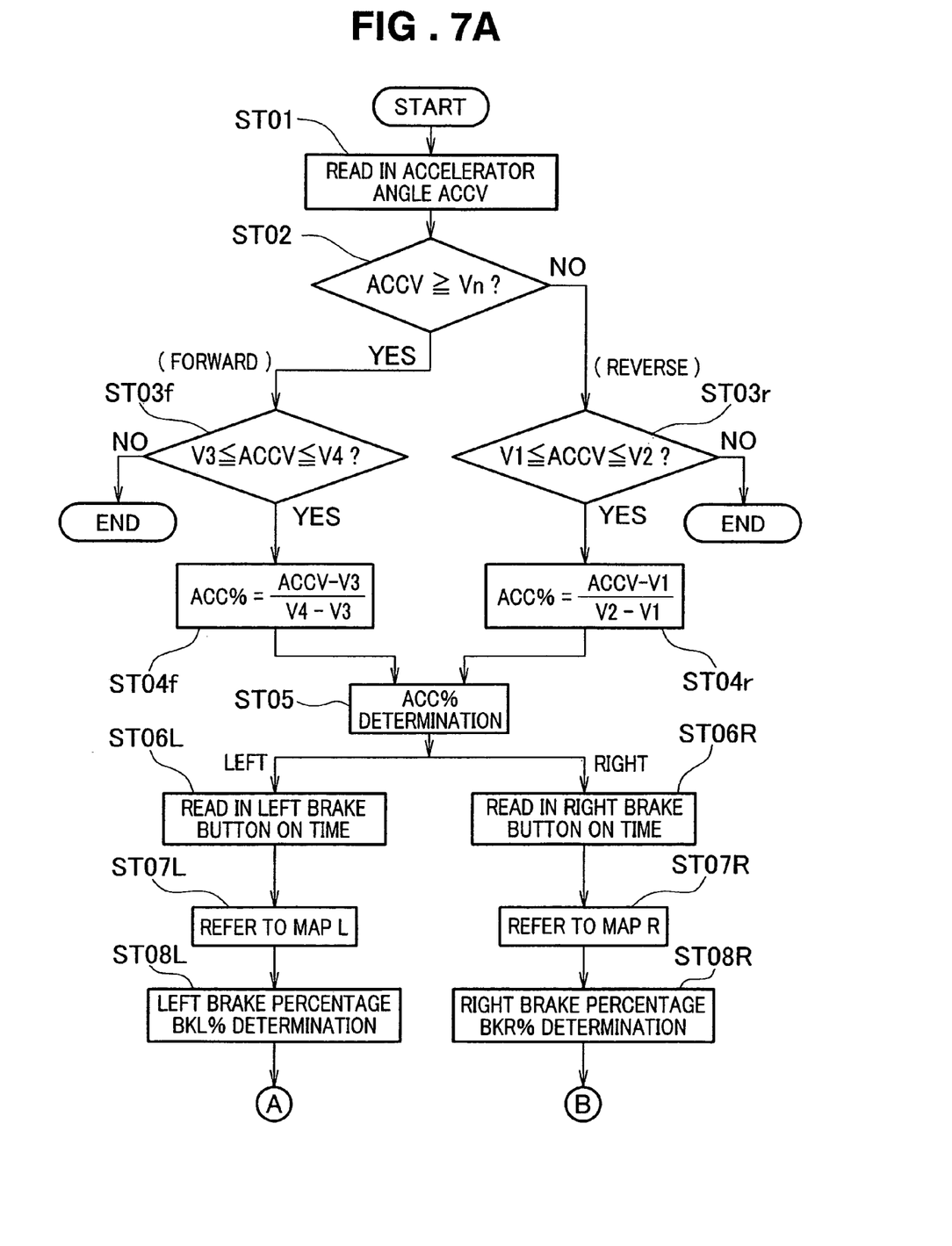
FIG. 7A and FIG. 7B are flow charts for obtaining motor control values of the invention.
Figure 7B:
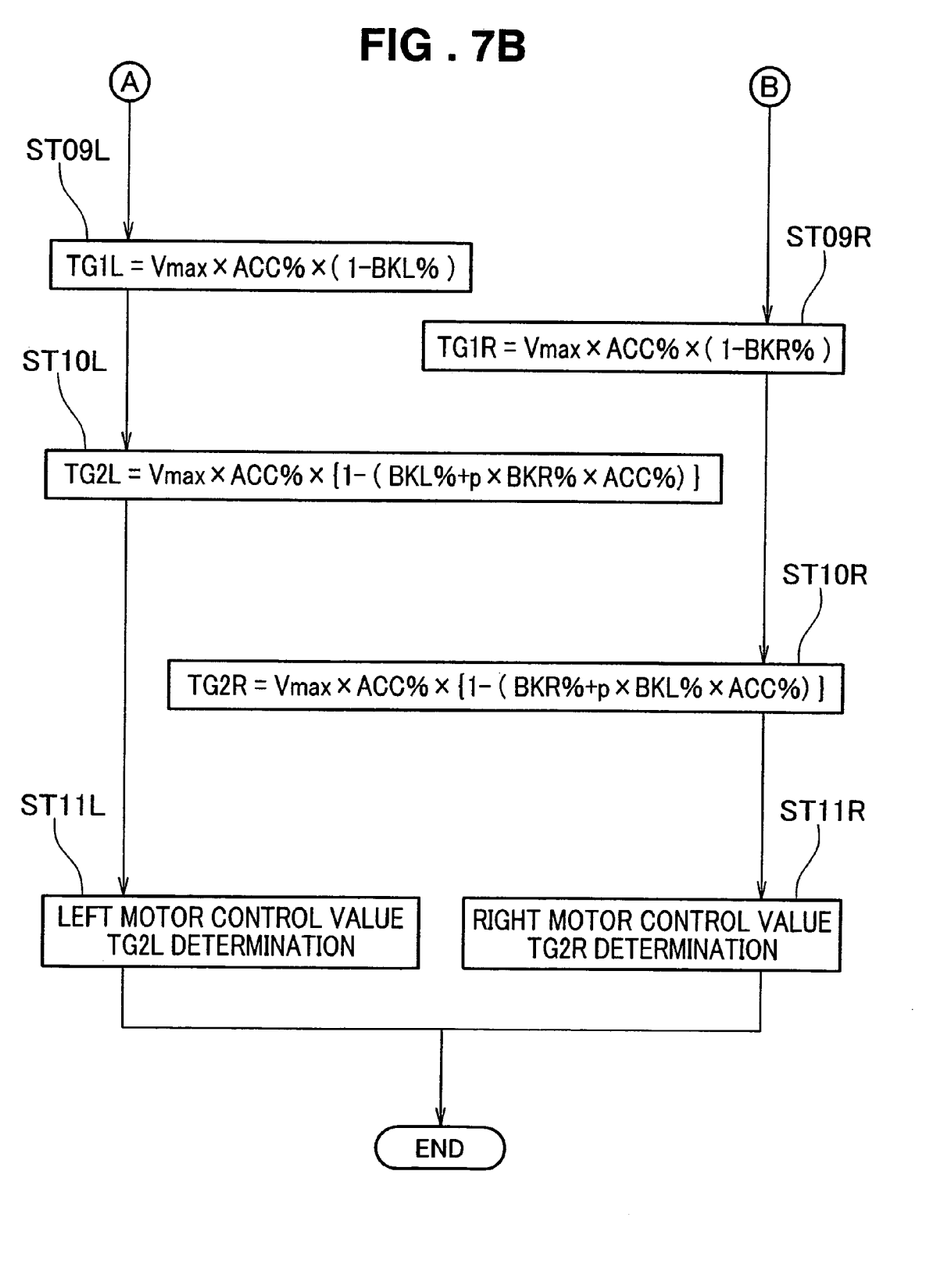
Figure 9A:
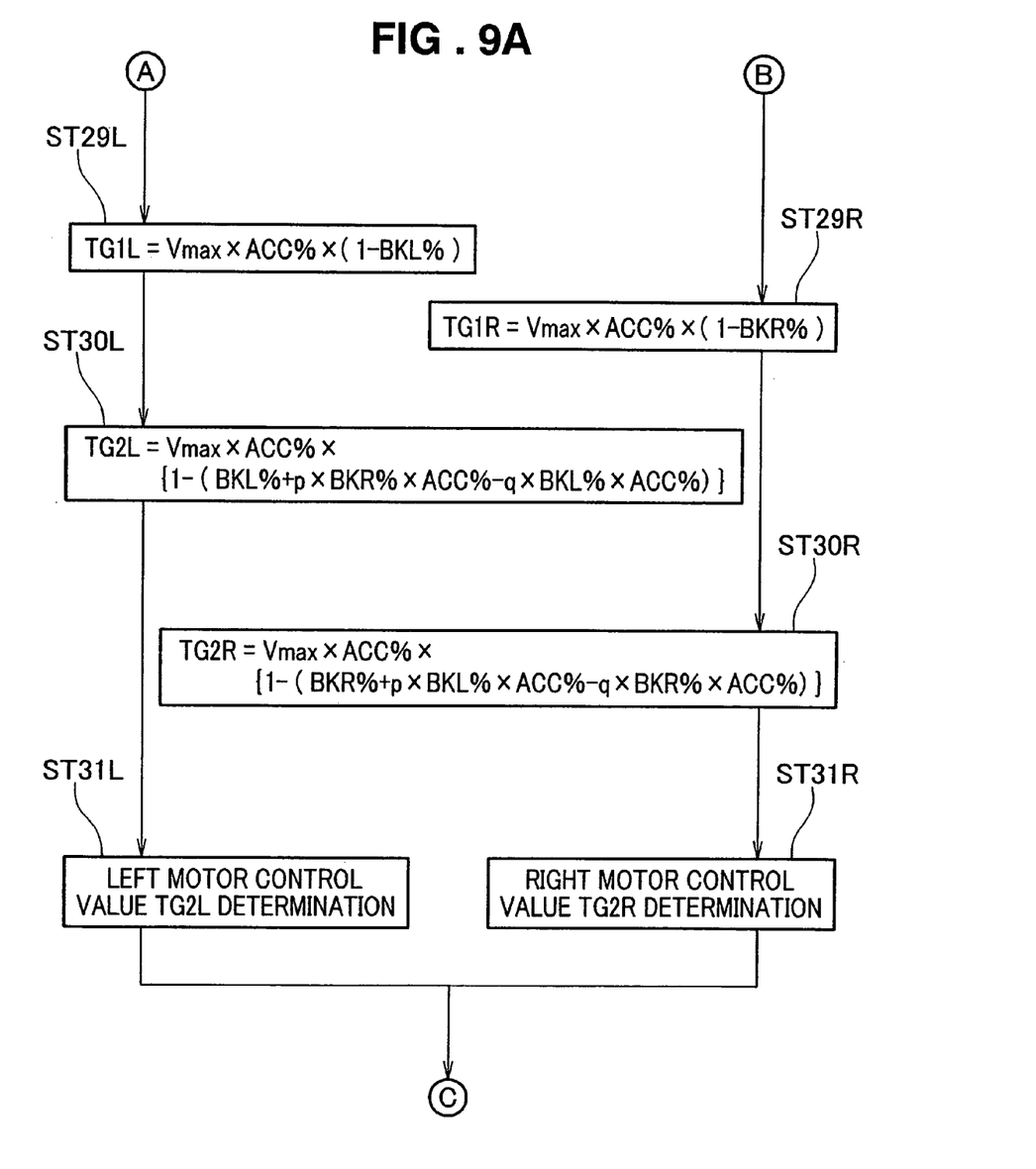
FIG. 9A is a flow chart showing another preferred embodiment of obtaining motor control values shown in FIG. 7B.
Figure 9B:
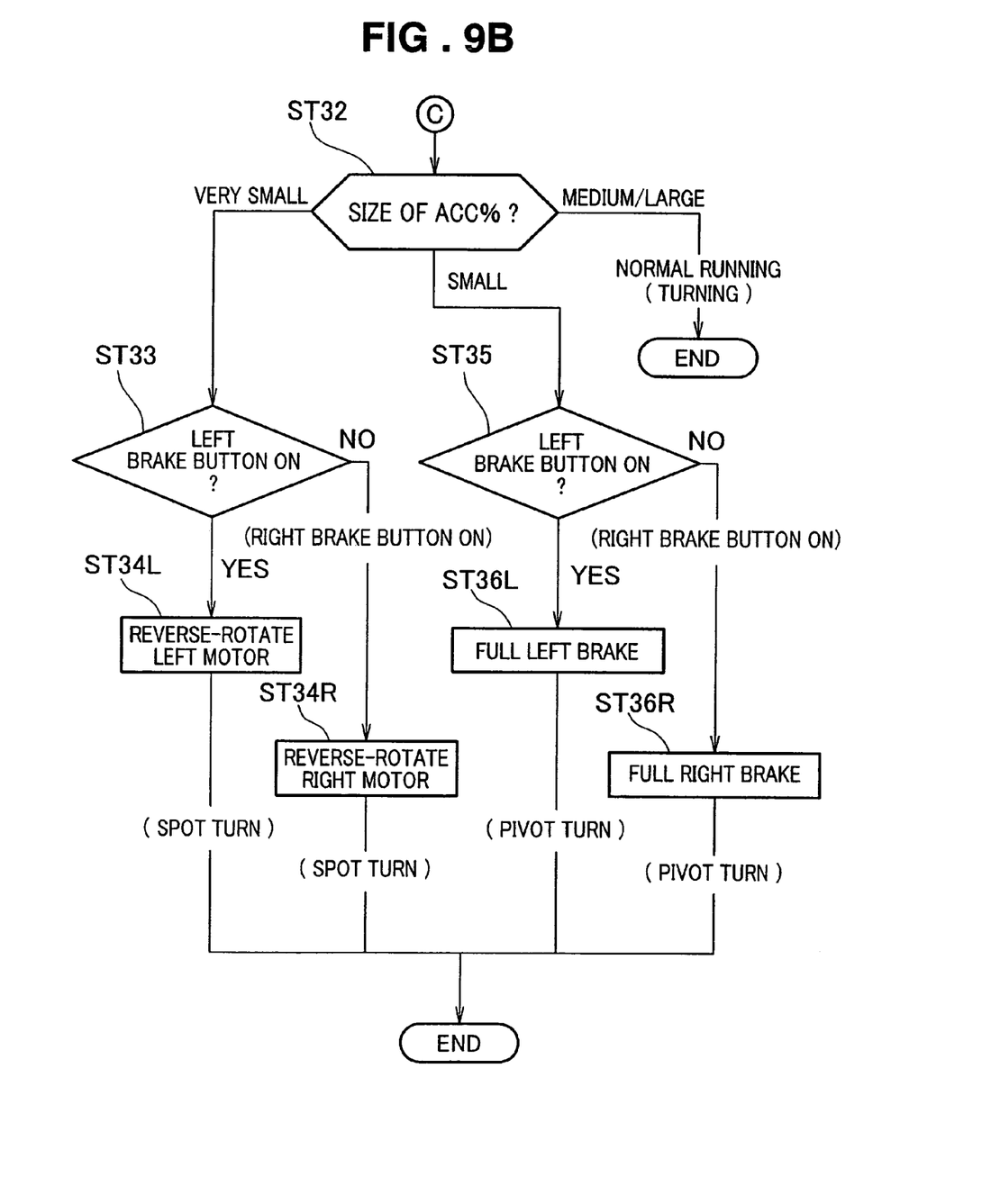
FIG. 9B is a flow chart for turning the snow-remover on the basis of these motor control values.

FIG. 9A shows another preferred embodiment of obtaining the motor control values shown in FIG. 7B.

ST29L: On the basis of the Vmax shown in FIG. 5C, the ACC % determined in ST05 of FIG. 7A and the BKL % calculated in ST08L, the following calculation is carried out. TG1L=Vmax×ACC %×(1−BKL %).

When the left brake percentage BKL % is large, it is wasteful to feed a large voltage to the left electric motor 33L, and it is desirable to cut down the power supplied to the left electric motor 33L.

When the left brake percentage BKL % is large, BKL % takes a large value near to 1.0, and (1−BKL %) takes a small value near to 0. By multiplying this (1−BKL %) by (Vmax×ACC %) it is possible to set an amended accelerator angle that takes into account the left brake percentage.

It is advantageous to take into account the left brake percentage like this when determining the voltage at which the left electric motor is controlled. However, if the right brake percentage is large, it is desirable for the control voltage of the left electric motor 33L to be lowered still further. If the right brake percentage is small, its influence on the left electric motor 33L can be ignored.

It is more desirable to take into account both the left brake percentage and the right brake percentage like this when determining the voltage at which the left electric motor is controlled.

So, the idea of replacing the BKL % in the last term of ST29L with (BKL %+p×BKR %×ACC %−q×BKL %×ACC %) will be considered. BKR % is the right brake percentage.

When considering the left electric motor, it seems likely that the influence of the right brake percentage will be more significant the larger is the accelerator percentage ACC %. So, the right brake percentage BKR % is multiplied by ACC %. And because when BKR % is directly added to BKL % the influence of the right brake percentage BKR % is too strong, it is multiplied by a coefficient p of about 0.3 to 0.5.

Also, as explained with reference to FIG. 8B, to employ a straight line Z as a second corrected brake percentage BKL %*, (−q×BKL %×ACC %) is added.

It can be seen that it is then appropriate to replace the BKL % in the last term of ST29L with (BKL %+p×BKR %×ACC %−q×BKL %×ACC %). This (BKL %+p×BKR %×ACC %−q×BKL %×ACC %) will be called the third corrected brake percentage.

ST30L: A corrected value TG2L (Left motor control value) of TG1L is calculated using the following formula. TG2L=Vmax×ACC % ×{1−(BKL %+p×BKR %×ACC %−q×BKL %×ACC %)}.

ST31L: Because a left motor control value TG2L has been determined, the left electric motor is driven in accordance with this TG2L, and processing continues to ST32 of FIG. 9B.

Because ST29R and ST30R are the same as the steps ST29L and ST30L for obtaining the left motor control value, their description will be omitted.

ST31R: Because a right motor control value TG2R has been determined, the right electric motor 33R is driven in accordance with this TG2R, and processing continues to ST32 of FIG. 9B.

If the left and right electric motors are controlled on the basis of the flow described above, in addition to it becoming unnecessary to supply the left and right electric motors with unnecessary electric power and electrical energy being saved in the electric vehicle, braking shock in the initial stage of braking can be greatly moderated.

Now, on the basis of the flow chart of FIG. 9B, pivot turning and spot turning will be explained.

ST32: The size of the accelerator percentage ACC % determined in ST05 of FIG. 7A is checked. In ST32, 'Small' means a low-speed state such that the machine body will not become unstable when a pivot turn is executed. 'Very Small' means a very low-speed state such that the machine body will not become unstable even when a spot turn is executed. 'Medium/Large' means any speed other than these 'Small' and 'Very Small'.

When the accelerator percentage ACC % is 'Medium/Large', the normal running including normal turning shown in FIG. 7A and FIG. 9A is executed.

ST33: When it is determined in ST32 that the accelerator percentage ACC % is 'Very Small', it is checked whether either of the left and right brake buttons is being pushed. If the left brake button is being pushed, processing proceeds to ST34L. If the right brake button is being pushed, processing proceeds to ST34R.

ST34L: In accordance with the flow chart of FIG. 9A, the left and right electric motors are being controlled with the motor control values TG2L and TG2R, but now the left electric motor is stopped and immediately reversed. If the machine body is moving forward, the right electric motor rotates forward under the right motor control value TG2R, and because the left electric motor rotates backward the machine body makes a spot turn to the left about the center of the machine body.

ST34R: In the same way as in the explanation of ST34L, the machine body makes spot turn to the right.

ST35: When it is determined in ST32 that the accelerator percentage ACC % is 'Small', it is checked whether either of the left and right brake buttons is being pushed. If the left brake button is being pushed, processing proceeds to ST36L. If the right brake button is being pushed, processing proceeds to ST36R.

ST36L: In accordance with the flow chart of FIG. 9A, the left and right electric motors are being controlled with the motor control values TG2L and TG2R, but now the left brake is fully braked to bring the left electric motor to a stopped state. Because the right electric motor is rotating forward under the right motor control value TG2R, the machine body makes a pivot turn to the left about the left crawler.

ST36R: In the same way as in the explanation of ST36L, the machine body makes pivot turn to the right.

Although in this preferred embodiment the example of a snow-remover has been used as an example of an electric vehicle, an electric vehicle according to the invention does not have to be a snow-remover and may alternatively be some other working machine such as a mower, a cultivator or a carrying vehicle.

Obviously, various minor changes and modifications of the present invention are possible in the light of the above teaching. It is therefore to be understood that within the scope of the appended claims the invention may be practiced otherwise than as specifically described.

What is claimed is:

1. A travel control method for an electric vehicle having left and right electric motors for driving respective left and right drive wheels and left and right brakes for regulating driving speeds of the respective left and right drive wheels, the travel control method comprising the steps of:
   reading in an accelerator angle from a position of an accelerator lever controlled by a driver;
   determining an accelerator percentage in accordance with the accelerator angle;
   reading in ON times of left and right brake buttons operated by the driver to operate the respective left and right brakes;
   determining left and right brake percentages of the respective left and right brakes in accordance with the respective ON times of the left and right brake buttons;
   determining a left motor control value by correcting the accelerator percentage with a corrected left brake percentage obtained by applying an influence of the right brake percentage to the left brake percentage;
   controlling the speed of the left electric motor using the left motor control value;
   determining a right motor control value by correcting the accelerator percentage with a corrected right brake percentage obtained by applying an influence of the left brake percentage to the right brake percentage; and
   controlling the speed of the right electric motor using the right motor control value.

2. A travel control method according to claim 1; wherein when the accelerator percentage is represented by ACC %, the left brake percentage is represented by BKL %, the right brake percentage is represented by BKR %, a coefficient of the influence of the brake percentage of one of the left and right electric motors with respect to the brake percentage of the other of the electric motors is represented by p (where p<1), and a maximum value of the electric motor control values is represented by Vmax, then the left brake percentage is (BKL %+p×BKR %×ACC %), the left motor control value TG2L is Vmax×ACC %×{1−(BKL %+p×BKR %×ACC %)}, the corrected right brake percentage is (BKR %+p×BKL %×ACC %), and the right motor control value TG2R is Vmax×ACC %×{1−(BKR %+p×BKL %×ACC %)}.

3. A travel control method according to claim 1; wherein when the accelerator percentage is represented by ACC %, the left brake percentage is represented by BKL %, the right brake percentage is represented by BKR %, a coefficient of the influence of the brake percentage of one of the left and right electric motors with respect to the brake percentage of the other of the electric motors is represented by p (where p<1), a correction coefficient for multiplying BKL %×ACC % and BKR %×ACC % by to approximate the left/right brake percentages to second order curves is represented by q, and the maximum value of the electric motor control values is represented by Vmax, then the corrected left brake percentage is (BKL %+p×BKR %×ACC %−q×BKL %×ACC %), the left motor control value TG2L is Vmax×ACC % {1−(BKL %+p×BKR %×ACC %−q×BKL %×ACC %)}, the corrected right brake percentage is (BKR %+p×BKL %×ACC %−q×BKR %×ACC %), and the right motor control value TG2R is Vmax×ACC %×{1−(BKR %+p×BKL %×ACC %−q×BKR %×ACC %)}.

4. A travel control method for an electric vehicle, comprising the steps of:
   providing an electric vehicle having first and second electric motors for driving respective first and second drive wheels, first and second brakes for braking the respective first and second drive wheels, and first and second brake buttons controllable between ON and OFF positions by an operator for controlling the respective first and second brakes;
   obtaining an accelerator angle from a position of an accelerator lever controlled by the operator;
   determining an accelerator percentage in accordance with the accelerator angle;
   obtaining ON times of the first and second brake buttons;
   determining brake percentages of the first and second brakes in accordance with the ON times of the respective first and second brake buttons;
   determining a control value for the first electric motor by correcting the accelerator percentage with a corrected brake percentage of the first brake obtained by applying an influence of the brake percentage of the second brake to the brake percentage of the first brake;
   controlling a speed of the first electric motor using the control value of the first electric motor;
   determining a control value for the second electric motor by correcting the accelerator percentage with a corrected brake percentage of the second brake obtained by applying an influence of the brake percentage of the first brake to the brake percentage of the second brake; and
   controlling a speed of the second electric motor using the control value of the second electric motor.

5. A travel control method according to claim 4; wherein when the accelerator percentage is represented by ACC %, the left brake percentage is represented by BKL %, the right brake percentage is represented by BKR %, a coefficient of the influence of the brake percentage of one of the left and right electric motors with respect to the brake percentage of the other of the electric motors is represented by p (where p<1), and a maximum value of the electric motor control values is represented by Vmax, then the left brake percentage is (BKL %+p×BKR %×ACC %), the left motor control value TG2L is Vmax×ACC %×{1−(BKL %+p×BKR %×ACC %)}, the corrected right brake percentage is (BKR %+p×BKL %×ACC %), and the right motor control value TG2R is Vmax×ACC %×{1−(BKR %+p×BKL %×ACC %)}.

6. A travel control method according to claim 4; wherein when the accelerator percentage is represented by ACC %, the left brake percentage is represented by BKL %, the right brake percentage is represented by BKR %, a coefficient of the influence of the brake percentage of one of the left and right electric motors with respect to the brake percentage of the other of the electric motors is represented by p (where p<1), a correction coefficient for multiplying BKL %×ACC % and BKR %×ACC % by to approximate the left/right brake percentages to second order curves is represented by q, and the maximum value of the electric motor control values is represented by Vmax, then the corrected left brake percentage is (BKL %+p×BKR %×ACC %−q×BKL %×ACC %), the left motor control value TG2L is Vmax×ACC % {1−(BKL %+p×BKR %×ACC %−q×BKL %×ACC %)}, the corrected right brake percentage is (BKR %+p×BKL %×ACC %−q×BKR %×ACC %), and the right motor control value TG2R is Vmax×ACC %×{1−(BKR %+p×BKL %×ACC %−q×BKR %×ACC %)}.

* * * * *